March 7, 1944.  J. H. LIENAU ET AL  2,343,464
AUTOMATIC VACUUM PAN CONTROL
Filed Feb. 23, 1940  6 Sheets-Sheet 4

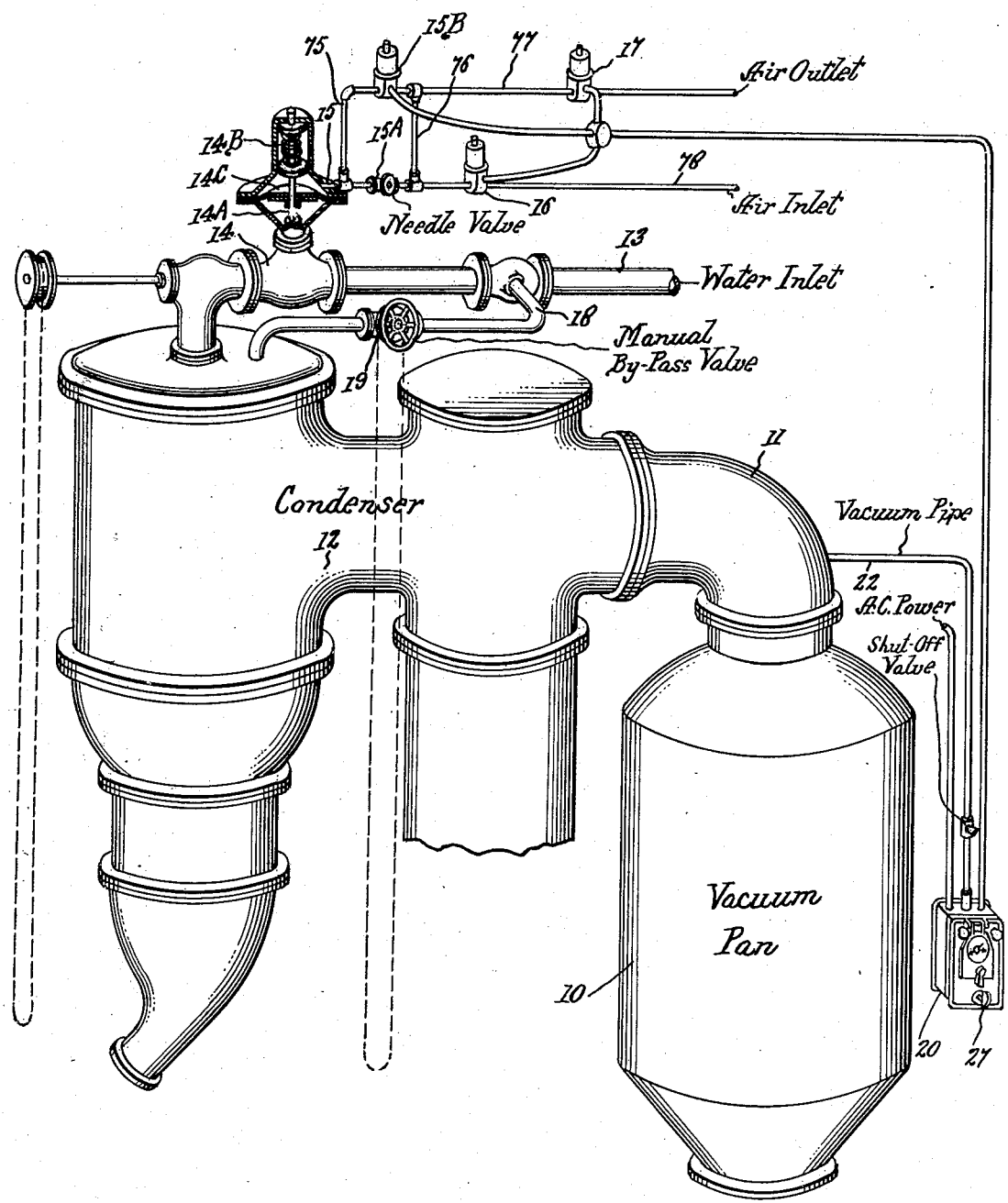

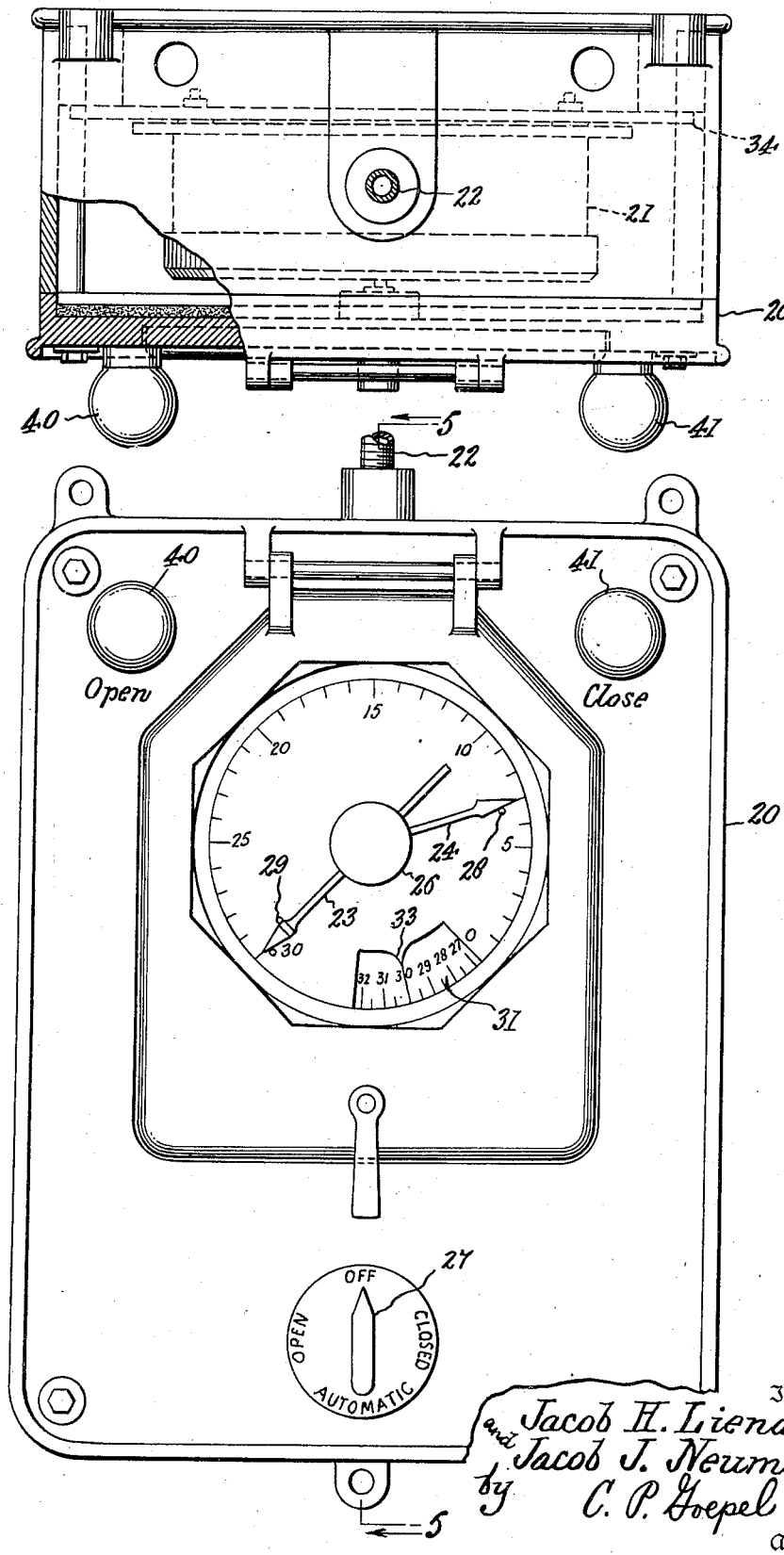

Inventors
Jacob H. Lienau
Jacob J. Newman
by C. P. Goepel
Attorney

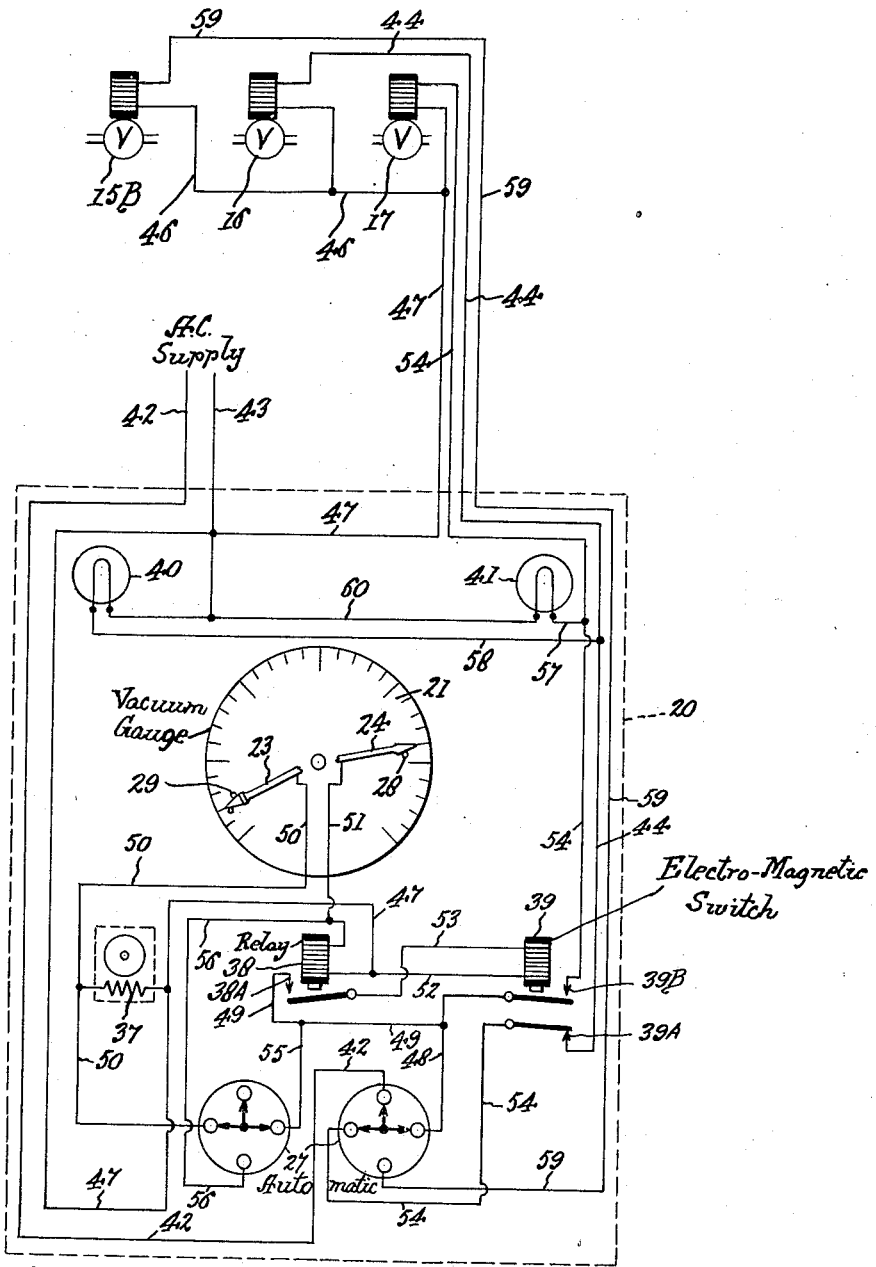
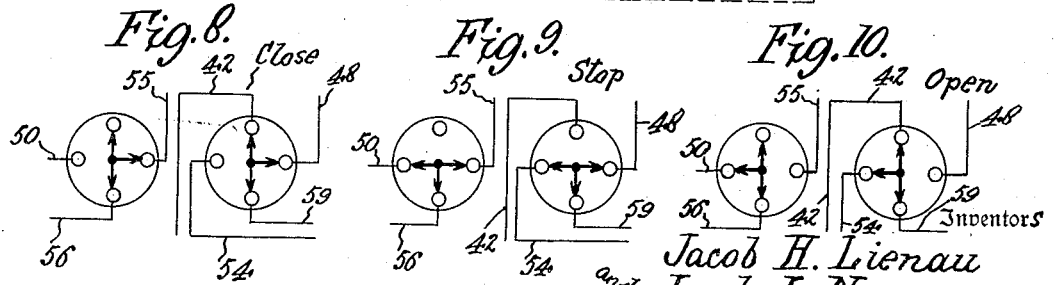

March 7, 1944.   J. H. LIENAU ET AL   2,343,464
AUTOMATIC VACUUM PAN CONTROL
Filed Feb. 23, 1940   6 Sheets-Sheet 6
*Fig. 11.*
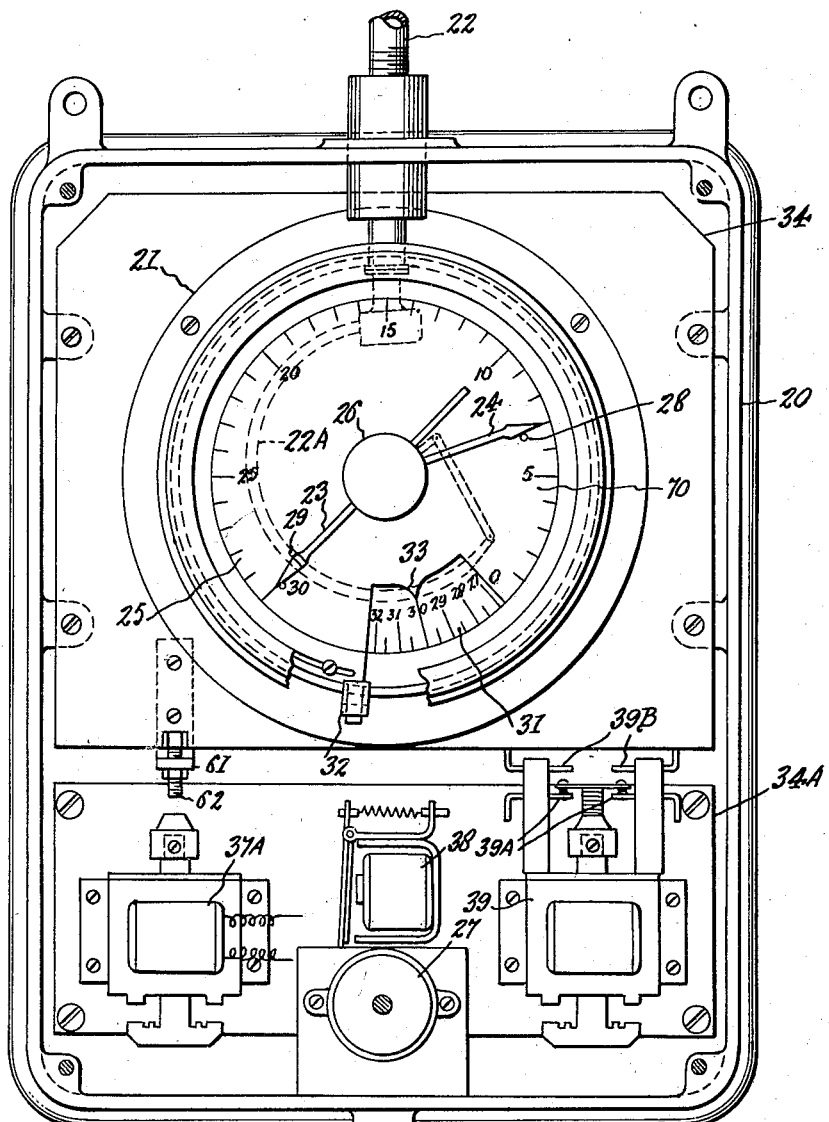
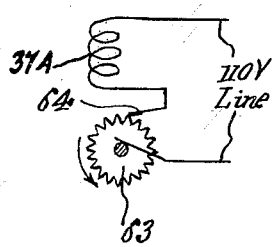
*Fig. 12.*
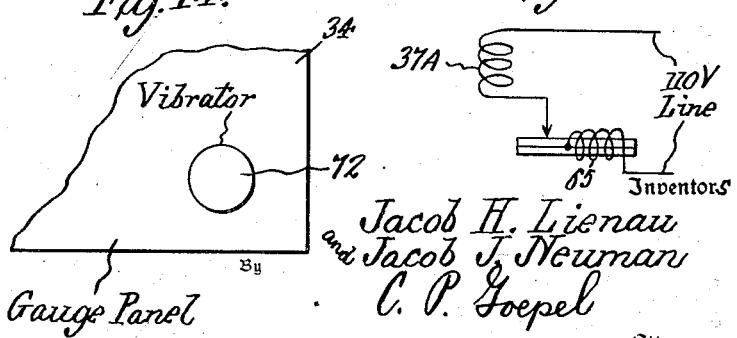
*Fig. 14.*   *Fig. 13.*
Inventors
Jacob H. Lienau
and Jacob J. Neuman
C. P. Goepel
By
Attorney Patented Mar. 7, 1944

2,343,464

UNITED STATES PATENT OFFICE 2,343,464

AUTOMATIC VACUUM PAN CONTROL

Jacob H. Lienau, New York, and Jacob J. Neuman, South Salem, N. Y.

Application February 23, 1940, Serial No. 320,478

8 Claims. (Cl. 159—44)

This invention relates to an automatic vacuum pan controller and has for its primary object and purpose to provide an improved controller for use with a system of vacuum regulation such as that disclosed in Patent No. 1,941,479 granted January 2, 1934.

As is well known in the art, even the best vacuum gauges, steam pressure gauges and air pressure gauges have a certain lag behind the true reading. This lag tends to cause a smaller than true reading when values are increasing and a greater than true reading when decreasing. This is due to friction in the pointer bearings and other moving parts and prevents regulation within close limits.

A principal object of the invention is to provide a controller that will permit boiling and concentration of substances such as sugar under accurate given conditions.

Therefore, one important object of the present invention is to provide a contact-making pressure-responsive controller capable of more accurate response to the actual change in pressure by overcoming friction.

Another object of the invention is to provide such a contact-making vacuum gauge which may be readily corrected for variations in barometric pressure, thus making possible the control of the vacuum pan evaporator relative to absolute zero pressure instead of relative to barometric pressure.

A further object of the invention is to simplify and improve the electrical control circuits employed.

With the above and other objects in view, the invention consists of the improved vacuum pan controller and in the form, construction and relative arrangement of its several parts, as will be hereinafter more fully described, illustrated in the accompanying drawings and subsequently incorporated in the subjoined claims.

In the drawings wherein I have illustrated the invention and in which similar reference characters designate corresponding parts throughout the several views:

Figure 1 is a diagrammatic view showing the general arrangement of the system constructed according to the present invention.

Figure 2 is a front elevation of the controller.

Figure 3 is a top plan view of the controller with parts broken away and parts shown in section.

Figure 7 is a schematic wiring diagram showing the electrical circuits.

Figures 8, 9 and 10 are schematic switch diagrams showing the connections for the several switch positions.

Figure 11 is a view similar to Figure 4 showing an alternate embodiment of a portion thereof.

Figure 12 is a circuit diagram for the alternate means of Figure 11.

Figure 13 is a circuit diagram showing a further alternate means involving a thermostatic interrupter, and Figure 14 is a fragmentary front view of the vacuum gauge carrying panel showing a vibrator thereon.

Figure 4:
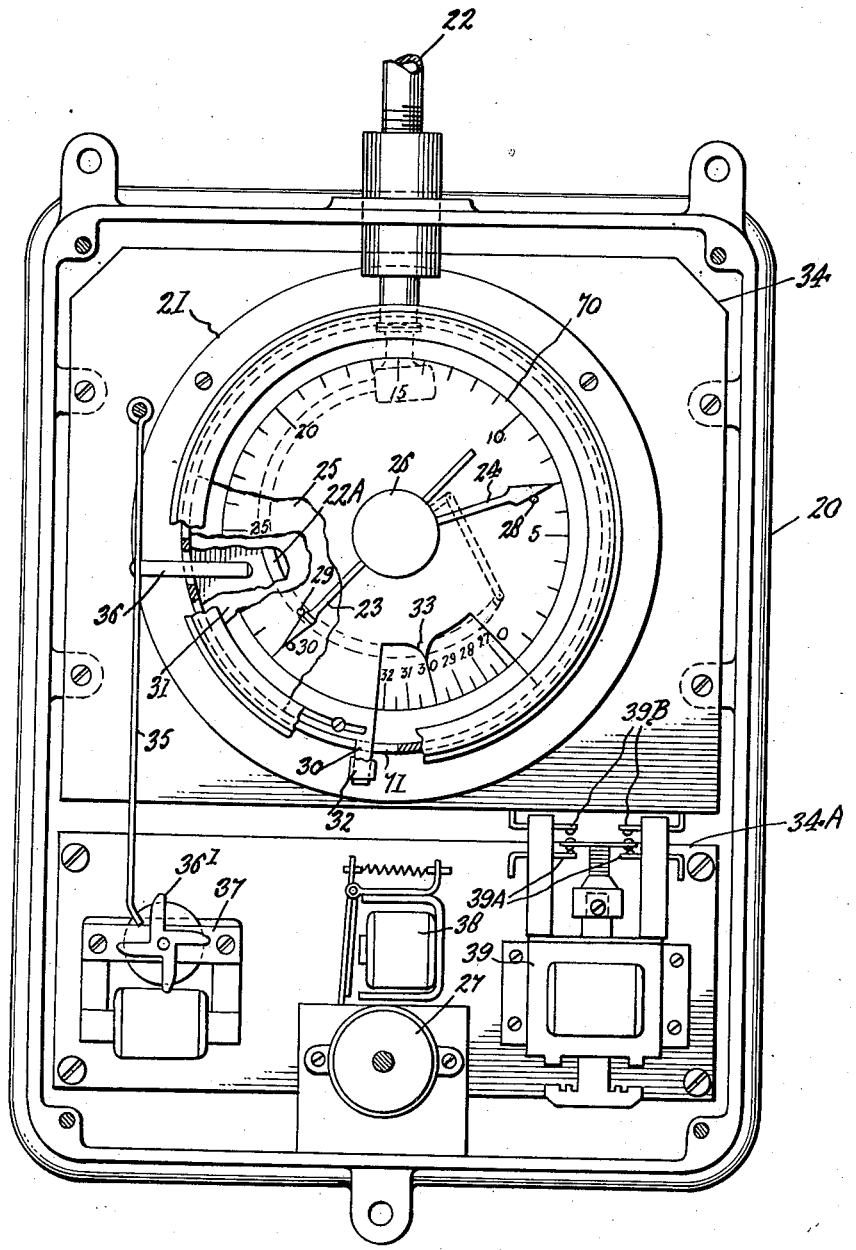
Figure 4 is a front elevation of the controller with the cover and dials partly broken away.
Figure 6:
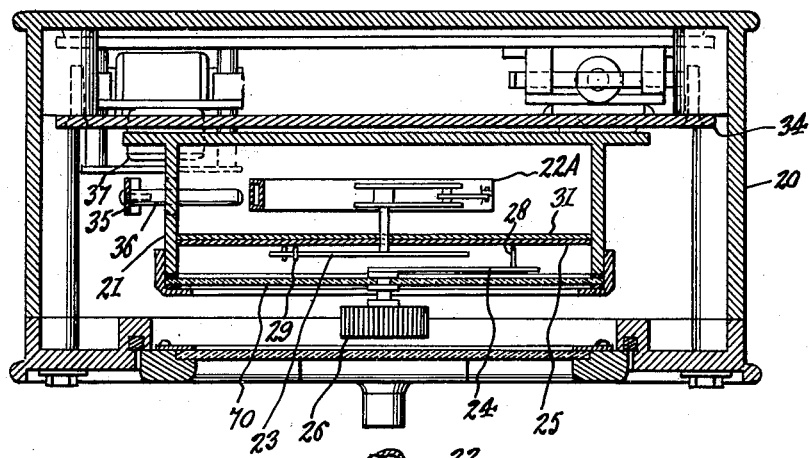
Figure 6 is a horizontal section taken on the line 6—6 in Figure 5.

Referring now to the drawings, 10 indicates a vacuum boiling pan of conventional form having a connection 11 at its upper end to the condenser 12 which is supplied with water through the pipe connection 13, the supply of water being regulated by the valve 14. Thus it will be understood that water supplied to the condenser 12 condenses the vapor generated by the boiling in the vacuum pan 10 thus producing a vacuum in said pan which is proportionate within certain limits to the quantity of water which is introduced in the condenser while the liquor is boiling. Therefore, it is evident that by the adjustment of the valve 14 the degree of vacuum in the pan 10 is varied or regulated.

This construction so far described is well known in the art. In the present form of the invention I employ an automatically operated water valve 14 which is operated by compressed air in lieu of the mottor driven valve of the above referred to patent.

The plunger 14A of the valve 14 is provided with the spring 14B which normally maintains the valve in closed position. The plunger 14A is also provided with a diaphragm 14C which, when acted upon by compressed air or other fluid pressure medium from the pipe 15, moves the plunger 14A against the bias of the spring 14B and opens the valve 14, thereby admitting water to the condenser 12.

The pipe 15 to the valve 14 is connected through the valve 16 to a suitable source of fluid pressure, such as compressed air, and through the valve 17 to the atmosphere. The valves 16 and 17 are electrically controlled so that when one is open the other is closed and vice versa. Thus when valve 16 is closed cutting off the air supply, valve 17 is open allowing the pressure above the diaphragm 14C to exhaust permitting the valve 14 to close. Interposed in the pipe 15 is the pressure reducing valve 15A which is set to a predetermined small opening so that the valve 14 opens and closes slowly in the same manner as the motor driven valve of the former patent.

It is thus seen that all the advantages of the motor driven valve are retained and the amount of electrical equipment is greatly reduced as the electrical starting and reversing for the motor is eliminated. Also by using the pressure reducing valve 15A a greater range of adjustment of the rate of opening and closing of the valve 14 is possible than with the motor drive. Also the valves 16 and 17 are cheaper than a motor and require less maintenance.

A by-pass 18 around the valve 14 with a hand operated valve 19 is provided in case it is desired for any reason to control the supply of water manually as in the case of emergency. Also another electro-pneumatic valve 15B is provided to by-pass the valve 15A when it is desired to control the valve 14 by use of the switch 27 in the controller 20 and provides quick opening and closing of the valve 14 as is hereinafter explained.

The electro-pneumatic valves 16 and 17 are electrically connected to and controlled by an automatic controller which is an improvement over the controller disclosed in the above idenfied patent. A housing 20 contains the vacuum gauge 21 which may be any standard make and is preferably of the Bourdon tube type and also unlike the former controller contains all the electrical control apparatus. Connection is made from the pan 10 to the vacuum gauge 21 by means of the pipe 22 at the connection 11.

Figure 5:
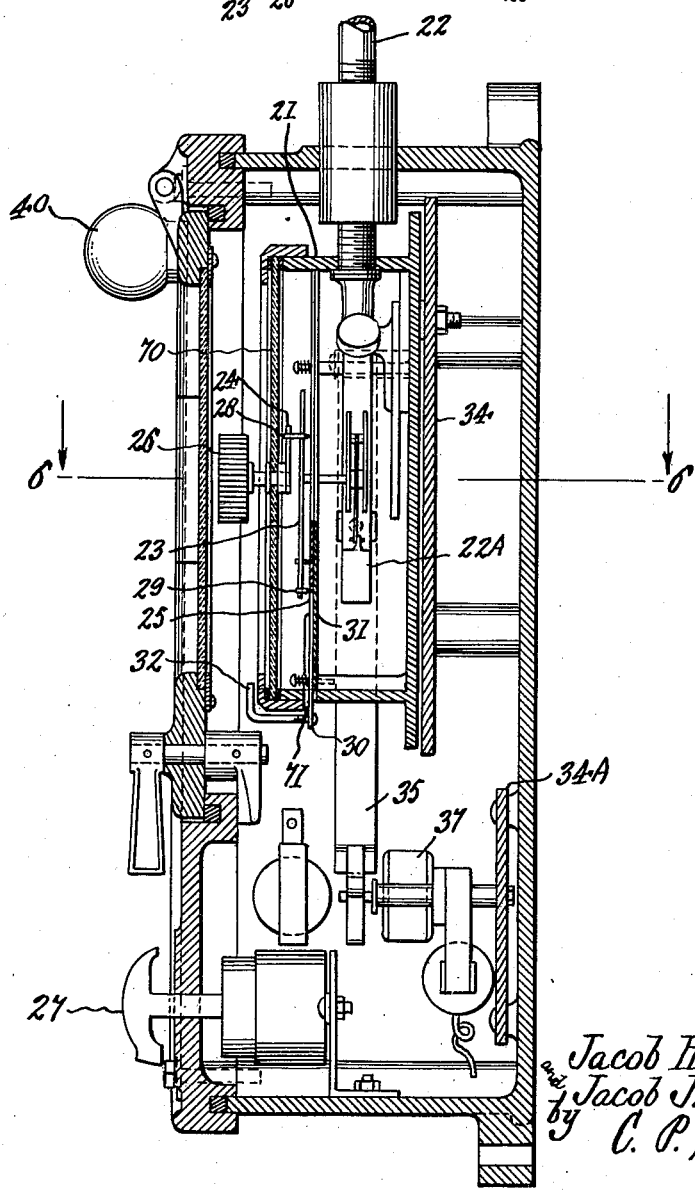
Figure 5 is a vertical section on the line 5—5 of Figure 2.

The vacuum gauge 21 is mounted on the panel 34 in the controller housing 20 and has the indicator hand or pointer 23 linked to the Bourdon tube 22A in the usual manner and responsive to variations in the pressure therein. The hand 23 is electrically insulated from the hand or pointer 24 which is manually adjustable with respect to the gauge scale 25 by means of the knob 26. These gauge hands are provided with the electrical contacts 28 and 29 near their outer ends. As shown in Figure 4 the gauge hand 24 lies on the inside of the glass cover 70 and is journaled through such cover with the knob 26 exposed on the outside of the cover for accessibility in rotating the hand 24 over the graduations of the dial 25. The gauge hand 23 is disposed in front of the dial 25 but spaced from the hand 24. However the electrical contacts carried by these hands or index members are concentric to cause circuit-closing engagement when the two hands register in angular position about the dial 25. Instead of the plain scale graduated in inches of mercury below atmospheric pressure, as on conventional gauges, the dial or scale 25 is graduated in inches of mercury above absolute zero pressure and has a projection 30 extending through a slot 71 (Figure 5) in the case of the vacuum gauge and fitted with a lever 32 so that it may be manually rotated in relation to the stationary scale 31. The scale 25 has a portion cut away and formed with a pointer 33 so that the graduations on the stationary scale 31 are visible and the scale 25 is rotated until said pointer 33 coincides with the correct barometric pressure, the degrees of which contained on fixed scale 31 are revealed in Figures 2 and 4. It is evident that the pointer 23 will then indicate pressure above absolute zero pressure in inches of mercury since it has been corrected for the change in barometric pressure. When no vacuum is impressed on the gauge the pointer 23 will always read the same as the pointer 33 and as vacuum is created will read less and less until at a complete vacuum it would read zero if the pointer 33 is set at the correct barometric pressure. Conventional vacuum gauges are calibrated to read vacuum in inches of mercury below mean atmospheric pressure at sea level and do not have any means of correcting for changes in the barometer due to altitude or weather conditions.

Supported for swinging motion from the panel 34 is the pendulum 35 which is flat of cross section and has the lower end thereof curved for engagement with the arms of the rotating member 36'. Opposite the vacuum gauge 21, the pendulum 35 is provided with a projection 36 which extends through a hole in the vacuum gauge case into close proximity with the Bourdon tube 22A. As the member 36' is slowly rotated by the small electric clock motor 37 the arms of the member 36' periodically push the pendulum 35 to one side and release it. Each time that it is so released and swings back, the projection 36 delivers a light tap to the Bourdon tube 22A.

As previously explained, due to friction all vacuum gauges and other pressure responsive instruments have a certain lag behind the true reading due to friction in the moving parts. This is illustrated by the change of reading of such instruments when they are jarred. The pendulum 35 by giving a slight tap to the Bourdon tube 22A periodically believes this friction and insures correct readings. It is easily seen that if it is desired to maintain the pressure in the pan at say 5 inches of mercury and as the pressure decreases the needle lags the true pressure by say ¼ inch of mercury, that it would not contact the needle 24 and start to close the water valve 14 until the actual pressure had dropped to 4.75 inches. Then as the valve 14 decreased the supply of condensing water the pressure would start to rise and would not move the needle 23 and break contact until the pressure had risen to 5.25 inches of mercury. It is thus seen that close regulation is impossible unless some means such as the pendulum 35 is provided to offset this effect by relieving friction in the gauge.

Another advantage of providing means for relieving this friction is that such instruments may be made much more rugged and still give accurate results.

Indicating lamps 40 and 41 indicate respectively the open and closed positions of the valve 14.

Mounted in the lower portion of the controller housing on the panel 34A are the motor 37, the sensitive relay 38, and the solenoid contactor 39. The rotary four position switch 27 is also mounted in the lower part of the housing. Referring to the circuit diagram Figure 7 their operation is explained.

The rotary switch 27 is the equivalent of two four position snap switches mounted on a common shaft and is shown schematically. In Figure 7 the switch 27 is shown in the position for automatic operation where the valve 14 is controlled by the vacuum gauge 21. Alternating current power is fed in through the wires 42 and 43. In the condition shown a circuit is completed from the wire 42 through the switch 27, the wire 54, the contact 39A of the contactor 39, and the wire 44 to the solenoid valve 16, thence through the wires 45, 46 and 47 to the supply wire 43 thus completing the circuit. The valve 16 thus opens and air is admitted to the water valve 14 and it opens also. As previously explained the water flowing into the condenser 12 condenses the vapor and the vacuum in the pan increases. As the vacuum increases the needle 23 of the vacuum gauge 21 moves clockwise indicating less pressure in the pan until it contacts the needle 24.

A circuit is thereby closed from the wire 42 through the switch 27, the wires 48, 49, and 55, the switch 27, wire 50, contacts 28 and 29, the wires 51 and 56 to the coil of the relay 38, thence through the wires 52 and 47 to the supply wire 43. Energizing the relay 38 closes relay switch 38A establishing circuit through the solenoid contactor 39 as follows: wire 42, switch 27, wires 48 and 49, relay switch 38A, wire 53, solenoid contactor 39, wires 52, 47 and supply wire 43. The contactor 39 thus closes and the circuit to the solenoid valve 16 is opened at the contact 39A, closing valve 16 and shutting off the air to the water supply valve 14. Simultaneously the contact 39B closes completing a circuit from the wire 42 through the switch 27 and the wires 48 and 49 to the solenoid of the valve 17, thence through the wire 47 to the supply wire 43. The valve 17 is thus energized and opens exhausting air from the water valve 14 thus decreasing the flow of water. The drop of pressure in the pan 10 is thus checked and as the flow of water continues to decrease the pressure starts to rise opening the contacts 28 and 29 thus breaking the circuit to the relay 38. It will be thus understood that the circuits are thereby all returned to their original condition and the valve 14 starts to open again increasing the flow of water to the condenser 12. The valve 14 thus continually moves between its full open and closed positions and regulates the flow of cooling water and thereby maintains a predetermined vacuum within the pan 10, as determined by the setting of the needle 24.

In use the needle valve 15A which controls the speed of opening and closing of the valve 14 is adjusted to give the closest regulation of the vacuum possible. If the valve 14 closes too suddenly all the water is cut off causing a sudden rise in pressure and before the cooling water is again turned on the pressure is too high. Conversely if the flow of water is increased too suddenly the pressure drops too far before the effect of shutting it off can take place. On the other hand if the valve 14 closes too slowly the effect is not felt soon enough and the pressure in the pan falls too low. This is also true of opening too slow as this allows the pressure to rise too much before the flow of water increases enough to have any effect.

It is thus seen that the pneumatic system can be adjusted to give much finer regulation than the motor driven valve system of the former patent. This increase is in addition to that obtained by the improvement in the vacuum gauge itself.

The tapper motor 37 is supplied with energy from the wire 42 through the switch 27, the wires 48, 49 and 55, the switch 27 and the wire 50 thence through the wire 47 to the other side of the line 43. It thus operates continuously while the switch 27 is in the position for automatic operation.

When it is desired to operate the valve 14 semi-automatically this may be done by means of the switch 27 and regardless of the position of the gauge hands 23 and 24. Referring to Figure 8 the switch position is shown for closing the valve 14. In this position of the switch 27 the relay 38 is energized through the wire 56 which in effect by-passes the needle contacts 28 and 29 and regardless of whether they are opened or closed. The valve 17 is thus opened and the valve 16 closed in the same manner as before. In addition to this another circuit is closed from the wire 42 through the switch 27 and the wire 59 to the solenoid valve 15B, thence through the wires 46 and 47 to the supply wire 43. Thus the valve 15B is opened providing an unobstructed path around the pressure reducing valve 15A through the valves 15B and 17 to atmosphere and the valve 14 closes instantaneously.

Referring to Figure 9 the position of the rotary switch 27 is shown to stop the valve 14 in any position between and including closed and full opened positions. In this case the wire 42 is totally disconnected from all apparatus and the valve 15B, 16 and 17 all remain closed, thus retaining any air pressure which may be in the valve 14. It is thus seen that the valve 14 may be opened to any desired position and then by turning the switch 27 to stop can be maintained in this position indefinitely.

Referring to Figure 10 the switch position is shown for opening the valve 14 semi-automatically. As is seen, in this position of the switch 27 the needle circuit is completely disconnected from the wire 42, and the relays 38 and 39 thus remain deenergized closing the circuit to the valve 16 through the contact 39A. In the same manner as when the switch 27 was in the position for close, the solenoid valve 15B is opened and the valve 14 opens instantaneously. In Figure 1 the legs 75 and 76 of the by-pass are shown to connect the by-passing valve 15B virtually in both the air outlet connection 77 and in the air pressure inlet connection 78. Thus the by-passing valve 15B may open, as in the case last mentioned, simultaneously with the opening of the inlet valve 16, while outlet valve 17 remains closed. Thus the fluid pressure through the connection 78 first passes inlet valve 16, thence flows up the leg 76 and through the by-passing valve 15B on its way to the diaphragm chamber of the fluid pressure device 14C. In this way the inlet of pressure by-passes the pressure restriction needle valve 15A, providing for the instantaneous opening of the water supply valve 14.

When the inlet valve 16 and the by-passing valve 15B are both closed and the outlet valve 17 opened, air is evacuated from the diaphragm chamber 14C only through the pressure restriction needle valve 15A, up the by-pass leg 76 and on out through the outlet connection 77. Thus the evacuation of air takes place slowly, allowing only the slow closing of the water supply valve 14.

However with inlet valve 16 closed, and both by-passing valves 15B and outlet valve 17 opened, a much quicker evacuation of the pressure from the diaphragm chamber 14C of the fluid pressure device is secured inasmuch as this fluid pressure does not go through the needle valve 15A but ascends through the by-passing leg 75 and thence in sequence passes valves 15B and 17.

The signal lights 40 and 41 are connected in parallel with the solenoid valves 16 and 17 and are energized from the wires 44 and 54 through the wires 57 and 58 in the same manner as these valves. They are connected to the supply wire 43 by the common wire 60. These lights thus indicate to the operator whether the valve 14 is being opened or closed.

Referring to Figures 11, 12, 13 and 14, I have shown an alternate embodiment of the means for jarring the vacuum gauge to relieve friction.

In this case, in place of the motor 37 and the pendulum 35 to tap the Bourdon tube 22A, a solenoid contactor 37A similar to the contactor 39 but with the contacts removed is mounted in the panel 34A. Attached to the panel 34 is the bracket 61 in which is adjustably threaded the bolt or anvil 62 disposed in vertical alignment with the plunger of the contactor 37A. It is thus seen that when the solenoid 37A is energized that the plunger thereof will deliver a tap to the bolt 62 jarring the panel 34 on which the vacuum gauge is mounted. This forms an effective method of relieving friction and insures accurate gauge readings. The solenoid 37A is periodically energized and deenergized by a suitable current interrupting device such as the star wheel 63, shown in Figure 12, which is rotated at constant speed and makes and breaks contact with the brush 64. An alternate means is shown in Figure 13 where a thermostatic interrupter 65 is used.

Another suggested means is to mount a vibrator 72, Figure 14, such as used in an ordinary electric bell on the gauge panel 34 to vibrate it and relieve friction.

With reference to the switch positions shown in Figures 8 and 10, these positions have been described as securing a semi-automatic action because, when the switch 27 is set to start or stop the flow of water to the condenser, this function is completed by the apparatus as differentiated from manual control of the water by the chain valves shown in Figure 1. Either semi-automatic control or remote control would describe the actions of these two switch positions.

It is obvious that various changes and modifications may be made in the details of construction and design of the above specifically described embodiment of this invention without departing from the spirit thereof, such changes and modifications being restricted only by the scope of the following claims.

What is claimed is:

1. In a vacuum producing condenser unit including a valve for regulating the supply of water to the condenser; means for actuating said valve comprising means for biasing said valve to closed position, a fluid pressure device for opening said valve, a fluid pressure inlet connection to said device, a fluid pressure outlet connection from said device, inlet and outlet valves respectively in said connections, electro-magnetic means for opening and closing said inlet and outlet valves, circuits for said electro-magnetic means, switch means controlling the opening and closing of said circuits individually to the electro-magnetic means for said inlet and outlet valves, a vacuum gauge having movable index means responsive to the degree of vacuum, other manually-settable index means associated with the first mentioned index means, means for periodically jarring said vacuum gauge to overcome frictional lag in said movable index means, whereby the latter is instantaneously responsive to changes in the vacuum conditions, a normally open circuit including said two index means closable in one position of said switch means, and electromagnetic switch means in said last named circuit normally closing the first named circuit to the inlet valve to open said inlet valve and adapted on closing of the index means circuit to open the first named circuit to said inlet valve and close the circuit to said outlet valve to evacuate the pressure from said fluid pressure device.

2. In a vacuum producing condenser unit including a valve for regulating the supply of water to the condenser; means for actuating said valve comprising spring means normally urging said valve to a closed position, a fluid pressure device for opening said valve, a fluid pressure inlet connection to said device, a fluid pressure outlet connection from said device, an inlet valve in the inlet connection, an outlet valve in said outlet connection, a manually-settable pressure restricting valve in said inlet connection, a by-passing valve by-passing said manually-settable valve and located in the outlet connection, electro-magnetic means for individually actuating said inlet, outlet and by-passing valves, separate circuits for the several electro-magnetic means, a switch having one position to normally close the circuit to the electro-magnetic means of the inlet valve to open such inlet valve supplying fluid pressure to said device and at the same time to maintain open the circuits to the electro-magnetic means of said by-passing and outlet valves to close said valves against the escape of the fluid pressure from said device, a vacuum gauge having a movable index member responsive to the degrees of vacuum, a manually-settable index member on said gauge, means for periodically jarring said vacuum gauge to overcome frictional lag in said movable index member, whereby the latter is instantaneously responsive to changes in the vacuum conditions, a normally open circuit for said index members, a relay in said last named circuit, and an electro-magnetic switch controllable by said relay for interrupting the circuit to the electro-magnet of said inlet valve and closing simultaneously the circuits to said by-passing and outlet valves.

3. In a vacuum producing condenser unit including a valve for regulating the supply of water to the condenser; means for actuating said valve comprising spring means normally biasing said valve to a closed position, a fluid pressure device for opening said valve, a fluid pressure inlet connection to said device, a fluid pressure outlet connection from said device, an inlet valve in the inlet connection, an outlet valve in said outlet connection, a manually-settable pressure restricting valve in said inlet connection, a by-passing valve by-passing said manually-settable valve and located in the outlet connection, electro-magnetic means for individually actuating said inlet, outlet and by-passing valves, separate circuits for the several electro-magnetic means, a switch having one position to normally close the circuit to the electro-magnetic means of the inlet valve to open such inlet valve supplying fluid pressure to said device and at the same time to maintain open the circuits to the electro-magnetic means of said by-passing and outlet valves to close said valves against the escape of the fluid pressure from said device, a vacuum gauge having a movable index member responsive to the degrees of vacuum, a manually-settable index member on said gauge, means for periodically jarring said vacuum gauge to overcome frictional lag in said movable index member, whereby the latter is instantaneously responsive to changes in the vacuum conditions, a normally open circuit for said index members, a relay in said last named circuit, an electro-magnetic switch controllable by said relay for interrupting the circuit to the electro-magnet of said inlet valve and closing simultaneously the circuits to said by-passing and outlet valves, said switch having a second position disconnecting said index members circuit from the supply mains, a circuit established by said second switch position by-passing the circuit through said index members and energizing said relay and thereby energizing said electro-magnetic switch to cause opening of both said by-passing and outlet valves and the closing of said inlet valve to cause instantaneous closing of said water supply valve.

4. In a vacuum producing condenser unit including a valve for regulating the supply of water to the condenser, means for actuating said valve comprising means normally urging said valve to a closed position, a fluid pressure device for opening said valve, a fluid pressure inlet connection to said device, a fluid pressure outlet connection from said device, an inlet valve in the inlet connection, an outlet valve in said outlet connection, a manually-settable pressure restricting valve in said inlet connection, a by-passing valve by-passing said manually-settable valve and located in the outlet connection, electro-magnetic means for individually actuating said inlet, outlet and by-passing valves, separate circuits for the several electro-magnetic means, a switch having one position to normally close the circuit to the electro-magnetic means of the inlet valve to open such inlet valve supplying fluid pressure to said device and at the same time to maintain open the circuits to the electromagnetic means of said by-passing and outlet valves to close said valves against the escape of the fluid pressure from said device, a vacuum gauge having a movable index member responsive to the degrees of vacuum, a manually-settable index member on said gauge, means for periodically jarring said vacuum gauge to overcome frictional lag in said movable index member, whereby the latter is instantaneously responsive to changes in the vacuum conditions, a normally open circuit for said index members, a relay in said last named circuit, an electro-magnetic switch controllable by said relay for interrupting the circuit to the electro-magnet of said inlet valve and closing simultaneously the circuits to said by-passing and outlet valves, said switch having another position to enable the water supply valve to be stopped in any position between and including closed and full opened positions including means for disconnecting the supply mains from the circuits to the valve electro-magnetic actuating means whereby said inlet, outlet and by-passing valves all remain closed to retain any air pressure residual in the fluid pressure device.

5. In a vacuum producing condenser unit including a valve for regulating the supply of water to the condenser; means for actuating said valve comprising means normally urging said valve to a closed position, a fluid pressure device for opening said valve, a fluid pressure inlet connection to said device, a fluid pressure outlet connection from said device, an inlet valve in the inlet connection, an outlet valve in said outlet connection, a manually-settable pressure restricting valve in said inlet connection, a by-passing valve by-passing said manually-settable valve and located in the outlet connection, electro-magnetic means for individually actuating said inlet, outlet and by-passing valves, separate circuits for the several electro-magnetic means, a switch having one position to normally close the circuit to the electro-magnetic means of the inlet valve to open such inlet valve supplying fluid pressure to said device and at the same time to maintain open the circuits to the electro-magnetic means of said by-passing and outlet valves to close said valves against the escape of the fluid pressure from said device, a vacuum gauge having a movable index member responsive to the degrees of vacuum, a manually-settable index member on said gauge, means for periodically jarring said vacuum gauge to overcome frictional lag in said movable index member, whereby the latter is instantaneously responsive to changes in the vacuum conditions, a normally open circuit for said index members, a relay in said last named circuit, an electro-magnetic switch controllable by said relay for interrupting the circuit to the electro-magnet of said inlet valve and closing simultaneously the circuits to said by-passing and outlet valves, said switch having another position for opening the water supply valve semi-automatically including parts for completely disconnecting from the mains the index members circuit causing said relay and electro-magnetic switch to remain de-energized to open said inlet valve and also to simultaneously open said by-passing valve adapted to permit the rapid supply of the fluid pressure to said fluid pressure device through said inlet and by-passing valves about said manually-settable pressure restricting valve to enable the water supply valve to open instantaneously.

6. In a vacuum producing condenser unit including a valve for regulating the supply of water to the condenser; means for actuating said valve comprising means normally urging said valve to a closed position, a fluid pressure device for opening said valve, a fluid pressure connection to said device, an inlet valve for controlling the supply of fluid pressure through said connection, a manually-settable valve for restricting the rate of the fluid through said connection, an outlet connection, by-passing legs connecting the inlet connection at opposite sides of said manually-settable valve with said outlet connection, an outlet valve in the outlet connection, and a by-passing valve in the outlet connection between said legs, actuators for said inlet, outlet and by-passing valves, a device adjustable to separate positions to control said inlet, outlet and by-passing valves, in one position, said device alternately opening and closing said inlet and outlet valves to require both the inlet and the outlet of the fluid pressure to take place through said manually-settable pressure restricting valve to secure the slow opening and closing of said water supply valve in another position, said device closing the inlet valve and simultaneously opening the by-passing and outlet valves to instantaneously cause quick evacuation of the fluid pressure device and the instantaneous closing of said water supply valve, in a third position, said device simultaneously closing said inlet, outlet and by-passing valves to retain the air pressure in said fluid pressure device to maintain the water supply valve in the instant position, and in a fourth position, said device closing said outlet valve and simultaneously opening said inlet and by-passing valves to secure instantaneous opening of said water supply valve.

7. In a vacuum pan control having a vacuum pan and condenser unit, a vacuum gauge responsive to the vacuum conditions in the vacuum pan, a water supply pipe for the condenser to regulate the vacuum by the condenser action, a valve for controlling the water supply to said condenser, a diaphragm responsive to fluid pressure for operating the water supply valve, and a casing for said diaphragm for the reception of pressure fluid to act on said diaphragm; the combination of an air inlet pipe for conducting fluid pressure to said diaphragm, an air outlet pipe for conducting fluid pressure from said diaphragm, each of said pipes communicating with said casing, a valve in each of said pipes, electro-magnetic means for controlling the operation of said inlet and outlet valves, and an electrical circuit for said electro-magnetic means including switch means cooperating with said gauge to operate the electro-magnetic means to open and close the inlet and outlet valves only alternately, to move the diaphragm for opening and closing the water supply valve, whereby the water is supplied to the condenser in accordance with the vacuum conditions by the instantaneous and direct translation of the vacuum conditions to the pressure fluid action upon the water supply valve.

8. In a vacuum producing condenser unit including a valve for regulating the supply of water to the condenser, said valve being normally urged to closed position; the combination with said valve of a fluid pressure device for opening the same, fluid pressure connection to said device, an inlet valve in said connection for controlling the supply of fluid pressure to said device, a manually settable valve for restricting the rate of flow of fluid through said connection, an outlet connection for the evacuation of fluid pressure from said device, by-passing legs connecting the inlet connection with said outlet connection at opposite sides of said manually settable valve, an outlet valve in said outlet connection, a by-passing valve in the outlet connection between said by-passing legs, and means responsive to the vacuum conditions for controlling said inlet, outlet and by-passing valves.

JACOB H. LIENAU.
JACOB J. NEUMAN.